(12) United States Patent
Tsai

(10) Patent No.: US 7,441,785 B1
(45) Date of Patent: Oct. 28, 2008

(54) FOLDABLE HANDCRAFT CAPABLE OF BEING CARRIED ABOUT ON ITS WHEELS AFTER BEING FOLDED

(75) Inventor: Chun-Sheng Tsai, Taichung County (TW)

(73) Assignee: Yewe Yih Enterprise Co., Ltd, Wugi Town, Taichung County (TW)

( * ) Notice: Subject to any disclaimer, the term of this patent is extended or adjusted under 35 U.S.C. 154(b) by 0 days.

(21) Appl. No.: 11/790,847

(22) Filed: Apr. 27, 2007

(51) Int. Cl.
  *B62B 1/12* (2006.01)
(52) U.S. Cl. .................... 280/47.29; 280/646; 280/652; 280/639
(58) Field of Classification Search ............... 280/47.29, 280/40, 646, 652, 651, 639
  See application file for complete search history.

(56) References Cited

U.S. PATENT DOCUMENTS

| | | | | |
|---|---|---|---|---|
| 2,505,440 A | * | 4/1950 | Bois et al. | 280/38 |
| 4,448,434 A | * | 5/1984 | Anderson | 280/40 |
| 5,312,006 A | * | 5/1994 | Lag | 211/195 |
| 5,348,325 A | * | 9/1994 | Abrams | 280/40 |
| 5,439,239 A | * | 8/1995 | Su | 280/40 |
| 5,630,601 A | * | 5/1997 | vom Braucke et al. | 280/40 |
| 5,803,471 A | * | 9/1998 | DeMars et al. | 280/40 |
| 5,984,327 A | * | 11/1999 | Hsieh et al. | 280/47.24 |
| 6,053,514 A | * | 4/2000 | Su | 280/40 |
| 6,425,599 B1 | * | 7/2002 | Tsai | 280/652 |
| 6,685,214 B2 | * | 2/2004 | Gregory | 280/652 |
| 7,097,183 B1 | * | 8/2006 | Su | 280/47.29 |
| 2002/0180184 A1 | * | 12/2002 | Chang | 280/652 |

* cited by examiner

*Primary Examiner*—Christopher Ellis
*Assistant Examiner*—Cynthia F. Collado
(74) *Attorney, Agent, or Firm*—Muncy, Geissler, Olds, & Lowe PLLC

(57) ABSTRACT

A foldable handcart can be carried about on its wheels after being folded. The handcart has a handle structure. The lower ends of the handle structure are pivotally coupled to a frame. The frame is formed of a pair of tubes. The lower ends of the tubes are pivotally coupled to a block board. The block board can be rotated upward to contact the frame. The lower ends of the tubes are respectively sleeved by a toothed ring which engages with the teeth on the top of a sleeving tube of a wheel seat. The other side of the wheel seat is pivotally coupled to a wheel. When the block board is rotated upward, the back wall of the block board is still apart from the ground by an appropriate distance, and the wheels can thus contact the ground. Thereby, the handcart can be easily carried about on its wheels.

2 Claims, 6 Drawing Sheets

US 7,441,785 B1

FOLDABLE HANDCRAFT CAPABLE OF BEING CARRIED ABOUT ON ITS WHEELS AFTER BEING FOLDED

FIELD OF THE INVENTION

The present invention relates to a handcart, particularly to a foldable handcart, wherein the wheels thereof can still full contact the ground after being folded, and the folded handcart can be easily and conveniently carried about on the wheels.

BACKGROUND OF THE INVENTION

Refer to FIG. 1 and FIG. 2 for a conventional handcart. The conventional handcart has a handle structure 1 formed of a pair of parallel tubes and a horizontal handle. A pair of rods is joined with the pair of tubes to form a frame 2. The right and left lower ends of the frame 2 are respectively connected with two connection elements 3. Each connection element 3 extends outward, and the lower part thereof functions as a shaft. A block board 4 is pivotally coupled to the bottoms of the two shafts and can be lifted to contact the front side of the frame 2. Each shaft is sleeved with a sleeving tube 5, which is arranged at one side of a wheel seat 6. The other side of the wheel seat 6 has a clamp socket 7, which can accommodate a wheel 8. A bolt is used to pivotally couple the wheel 8 with the clamp socket 7 so that the wheel 8 can free rotate. When the user intends to carry goods with the handcart, he rotates the block board 4 downward, and his hand holds and depresses the handle to tilt the handcart. The goods is placed in the lower part of the handle structure 1 and supported by the block board 4. Then, the user can carry the goods with the handcart on the rotating wheels 8.

When the handcart is not in use, the block board 4 is lifted to contact the frame 2, and the wheels 8 are rotated inward to make the diametral planes of the wheels 8 parallel to the block board 4, and the handle structure 1 is retracted into the frame 2. Thus, the volume of the handcart is reduced to facilitate transport or storage.

A handcart is usually made of a metallic material and weighs appreciably; therefore, it is strenuous to lift a handcart with a hand. Especially, it is laborious, to lift a large-size handcart with a hand and carry it about a long distance.

Based on many years' experience in fabricating and selling the related products, the Inventor has been persistently devoted to the research and improvement of handcarts and finally proposes the very useful present invention to overcome the problem of carrying a handcart.

SUMMARY OF THE INVENTION

The present invention proposes a foldable handcart capable of being carried about on its wheels after being folded. The handcart of the present invention has an inverse-U shape handle structure formed of tubes, and the lower ends of the handle structure are pivotally coupled to a frame. The frame is formed of a pair of tubes, and the lower ends of the tubes of the frame are pivotally coupled to a block board. The block board can be rotated upward to contact the front side of the frame. The lower portions of the tubes of the frame are respectively sleeved by a toothed ring, and each toothed ring engages with the top of a sleeving tube of a wheel seat. The other side of the wheel seat has a clamp socket, and the clamp socket is pivotally coupled to a wheel. When the block board is rotated upward, the back wall of the block board is still apart from the ground by an appropriate distance, and the wheels can thus contact the ground and roll on the ground. Thereby, the handcart of the present invention can be easily carried about on its wheels.

DETAILED DESCRIPTION OF THE PREFERRED EMBODIMENTS

Figure 1:
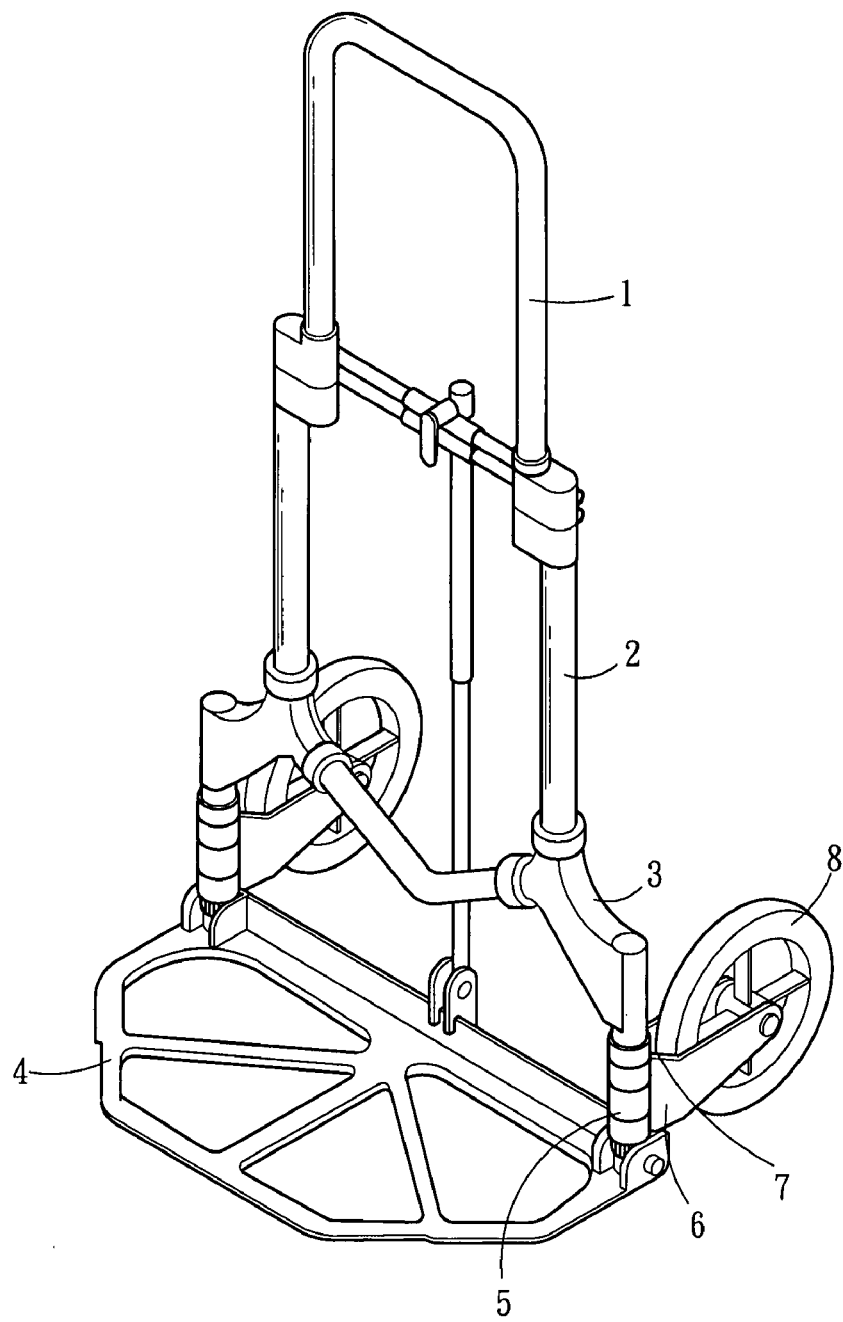
FIG. 1 is a perspective view of a conventional handcart.
Figure 2:
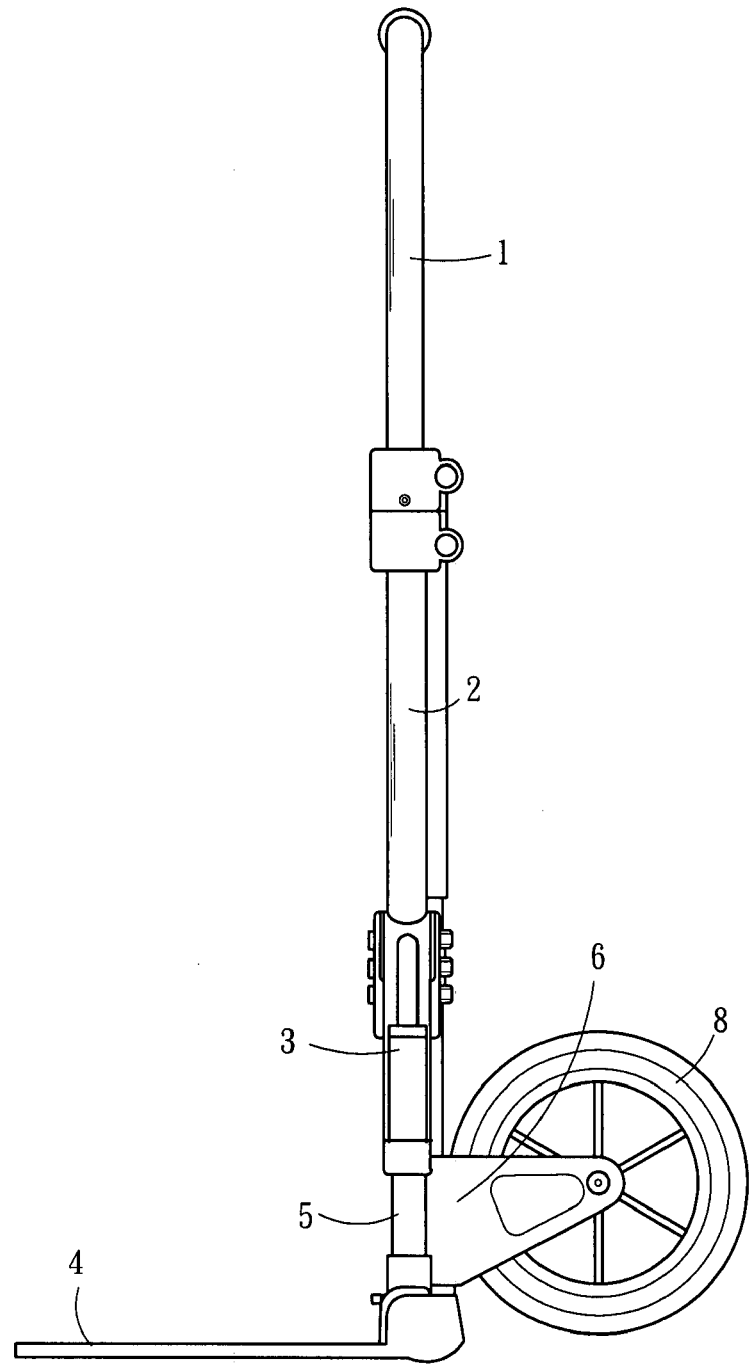
FIG. 2 is a side view of a conventional handcart.
Figure 3:
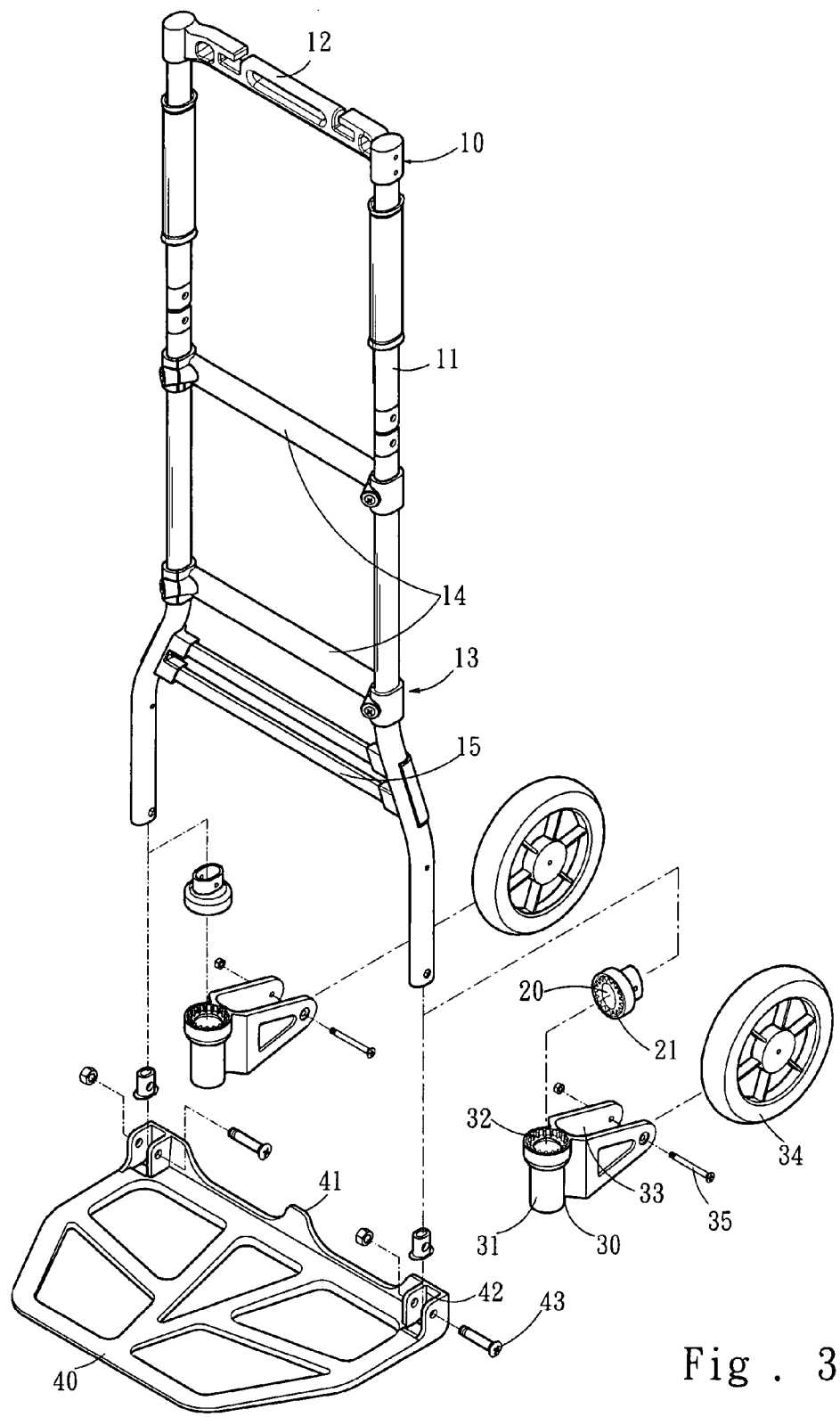
FIG. 3 is an exploded view of the handcart according to a preferred embodiment of the present invention.
Figure 4:
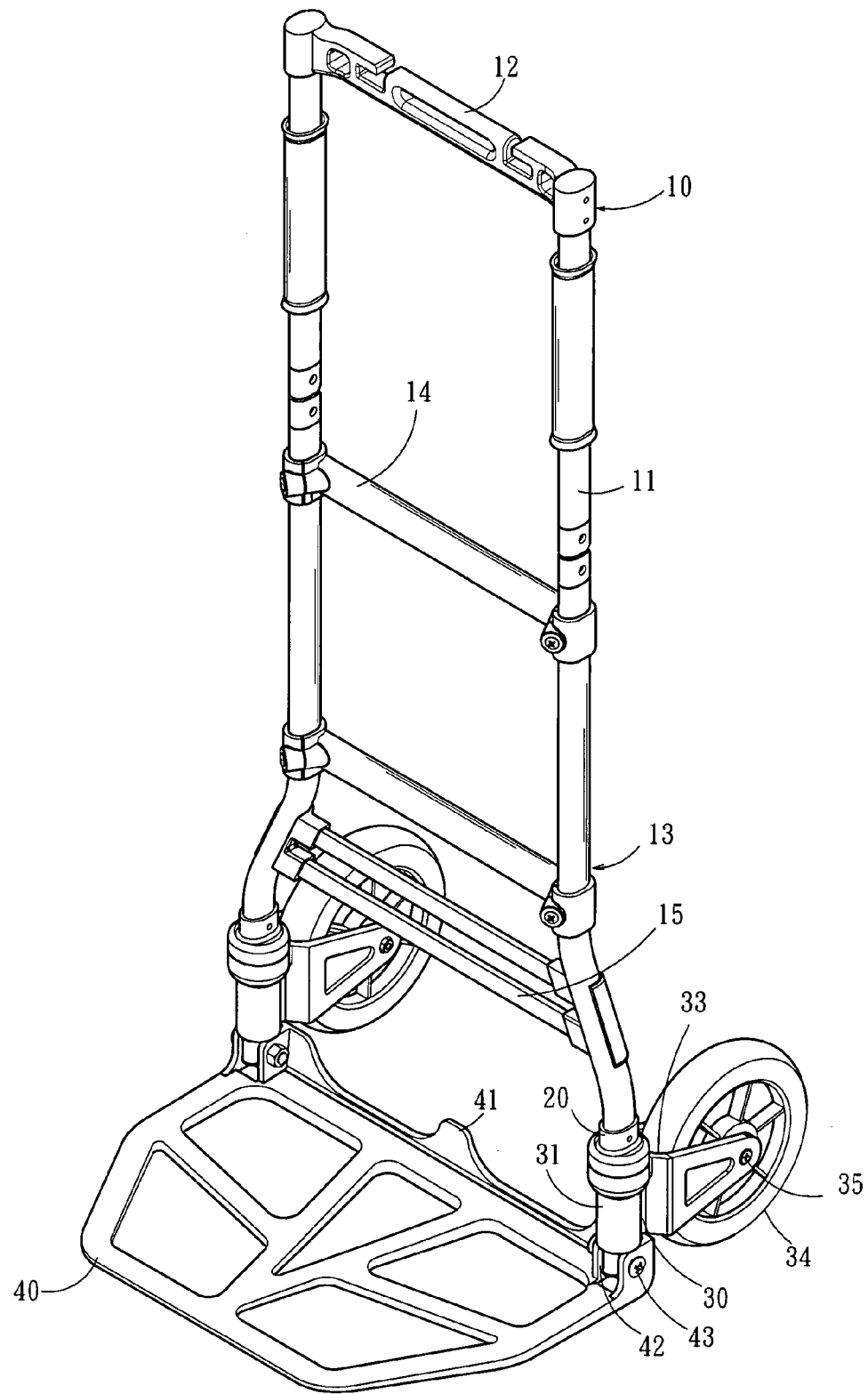
FIG. 4 is a perspective view of the handcart before being folded according to a preferred embodiment of the present invention.

Refer to FIG. 3 and FIG. 4. The foldable handcart capable of being carried about on its wheels after being folded of the present invention comprises the following components: a handle structure 10, a toothed ring 20, a wheel seat 30, and a block board 40.

The handle structure 10 has an inverse U shape and is formed of a pair of parallel tubes 11 respectively arranged at the left and the right and a horizontal handle 12. The cross section of the tube 11 has an elliptic shape. The lower ends of the handle structure 10 are pivotally coupled to the upper ends of a frame 13. The frame 13 is formed of a pair of tubes arranged respectively arranged at the left and the right, and the cross section of the tube of the frame 13 also has an elliptic shape. The tubes of the frame 13 are connected by two horizontal rods 14 lest distortion occur. The lower portions of the two tubes of the frame 13 extend outward to increase the span of the tubes and are connected by a support rod 15.

The toothed ring 20 is a hollow tube, and the inner contour of the toothed ring 20 matches the shape of the tube of the frame 13. The toothed ring 20 can be pushed upward from the lower end of the tube of the frame 13 to sleeve the tube of the frame 13. The toothed ring 20 will not rotate because of the sectional shape of tube of the frame 13. The lower portion of the toothed ring 20 is expanded to form a circular shape having a larger external diameter with a plurality of teeth 21 thereinside.

One side of the wheel seat 30 has a sleeving tube 31, and the top of the sleeving tube 31 is expanded outward with the inner rim having a plurality of teeth 32. The other side of the wheel seat 30 has a clamp socket 33 and a wheel 34. The wheel 34 is inserted into the clamp socket 33 along the diametral direction thereof, and a bolt 35 is used to pivotally couple the wheel 34 with the clamp socket 33. The top opening of the sleeving tube 31 can accommodate and engage with the teeth 21 inside the toothed ring 20; thus, the wheel seat 30 can rotate inward.

The rear side of the block board 40 has a back wall 41 vertical to the block board 40. Two lugs 42 are respectively arranged in the left and right sides of the block board 40 and respectively pivotally coupled to the lower ends of the tubes of the frame 13 with two bolts 43. Thus, the block board 40 can be rotated upward to fold up or rotated downward to stretch out. When the block board 40 folds up, the back wall 41 is still apart from the ground by an appropriate distance; thus, the wheels 34 can contact the ground and roll on the ground.

When the user intends to carry goods with the handcart of the present invention, the block board 40 is rotated downward to stretch out from the lower portion of the frame 13. The goods is placed on the frame 13 and supported by the horizontal rods 14, the support rod 15 and the block board 40. Then, his hand holds and depresses the horizontal handle 12 of the handle structure 10 to tilt the handcart. Thereby, the user can carry goods with the handcart of the present invention.

Figure 5:
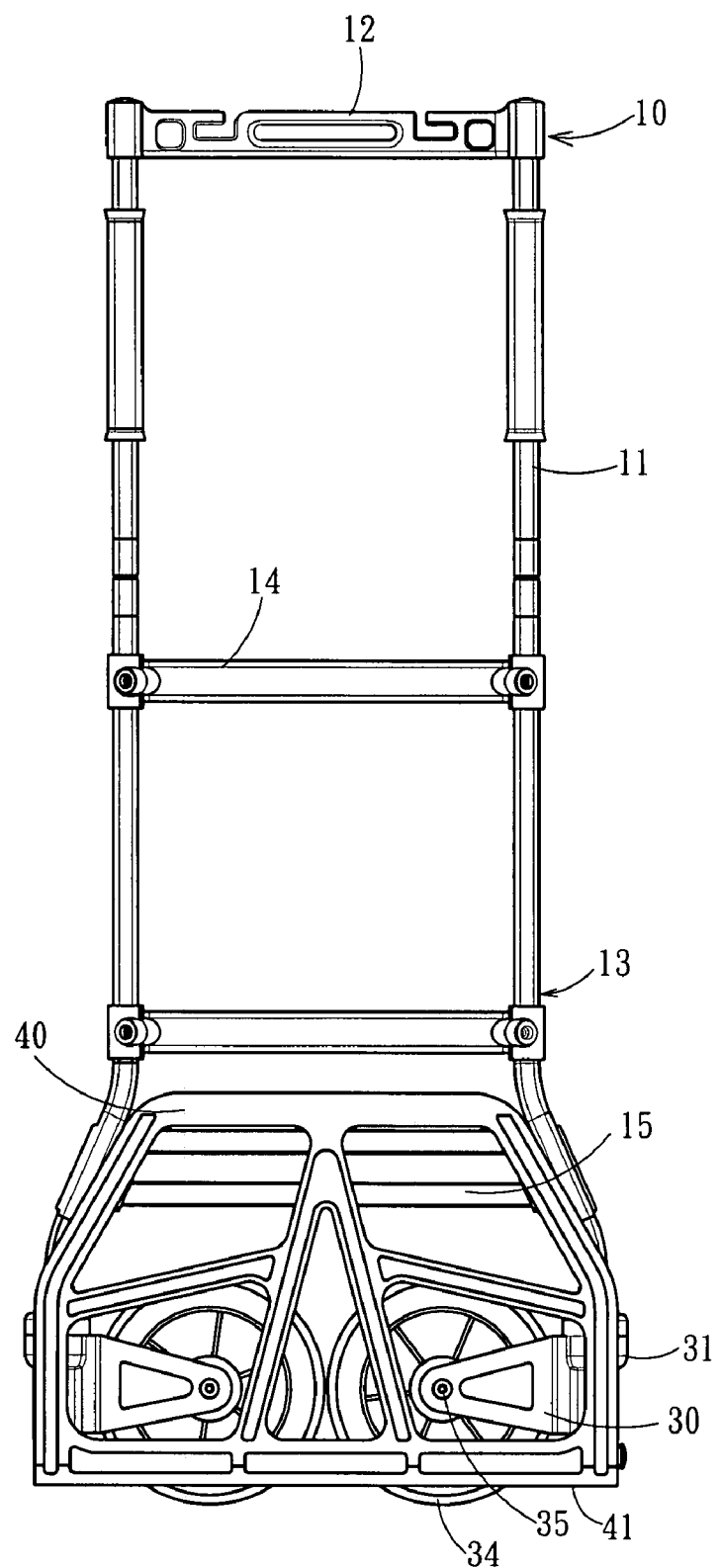
FIG. 5 is a front view of the handcart after being folded according to a preferred embodiment of the present invention.
Figure 6:
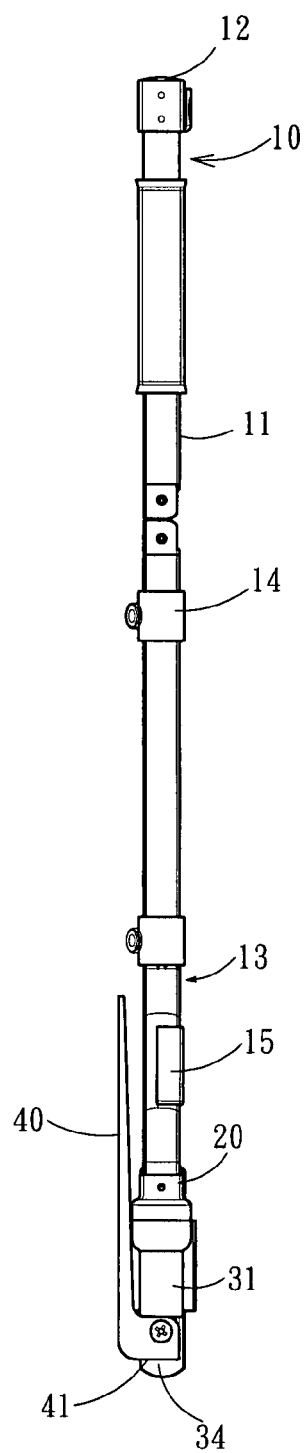
FIG. 6 is a side view of the handcart after being folded according to a preferred embodiment of the present invention.

Refer to FIG. 5 and FIG. 6. When the handcart of the present invention is to be folded, the block board 40 is rotated upward to contact the front side of the frame 13, and the wheels 34 are rotated inward to make the diametral plane thereof parallel to the block board 40. Thus, the volume of the handcart is reduced. After the handcart of the present invention is folded, the back wall 41 is still apart from the ground by an appropriate distance, and the wheels 34 can thus contact the ground. Then, the handcart can be laterally carried about on the wheels 34 easily.

The sample handcarts fabricated according to the specification and drawings of the present invention have been tested many times. It is proved that the present invention can indeed achieve the expected objectives. Besides, none identical or related product has appeared in documents or the market when the present invention is filed. Thus, the Inventor files a patent application for the present invention.

Those described above are only the preferred embodiments to exemplify the present invention but not intended to limit the scope of the present invention. Any equivalent modification or variation according to the spirit of the present invention is to be also included within the scope of the present invention.

What is claimed is:

1. A foldable handcart capable of being carried about on its wheels after being folded, comprising:
    a handle structure formed of a horizontal handle and a pair of parallel tubes respectively arranged at the left and the right, wherein the lower ends of said handle structure are pivotally coupled to the upper ends of a frame formed of a pair of tubes respectively arranged at the left and the right;
    a wheel seat, wherein one side of said wheel seat has a sleeving tube used to sleeve the tube of said frame, and the other side of said wheel seat has a clamp socket used to accommodate a wheel, and said wheel is pivotally coupled to said clamp socket with a bolt;
    a block board, wherein the rear side of said block board has a back wall vertical to said block board, and two lugs are respectively arranged in the left and right sides of said block board and respectively pivotally coupled to the lower ends of the tubes of said frame; when said block board is rotated upward, said back wall is apart from the ground by an appropriate distance, and said wheels can thus contact the ground; and
    two toothed ring, wherein the top of each said sleeving tube is expanded outward with a plurality of teeth annularly arranged thereinside; each said toothed ring is a hollow tube and used to sleeve the tube of said frame, and a plurality of teeth is annularly arranged in the lower portion of each said toothed ring, and said teeth engage with said teeth of said sleeving tube.

2. The foldable handcart capable of being carried about on its wheels after being folded according to claim 1, wherein the cross section of said tube of said handle structure has an elliptic shape, and the cross section of the tube of said frame also has an elliptic shape; the shape of the inner contour of said toothed ring is matched with the shape of the tube of said frame to sleeve the tube of said frame without any rotation; the lower portion of said toothed ring is expanded to form a circular shape having a larger external diameter.

\* \* \* \* \*